(12) United States Patent
Fernandez et al.

(10) Patent No.: US 11,879,035 B2
(45) Date of Patent: Jan. 23, 2024

(54) POLYCARBONATE (71) Applicant: SABIC GLOBAL TECHNOLOGIES B.V., Bergen op Zoom (NL)

(72) Inventors: Ignacio Vic Fernandez, Murcia (ES); David Del Agua Hernandez, Murcia (ES); Helena Varela Rizo, Alicante (ES)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 255 days.

(21) Appl. No.: 17/284,289

(22) PCT Filed: Sep. 12, 2019

(86) PCT No.: PCT/IB2019/057716
§ 371 (c)(1),
(2) Date: Apr. 9, 2021

(87) PCT Pub. No.: WO2020/074982
PCT Pub. Date: Apr. 16, 2020

(65) Prior Publication Data
US 2021/0347939 A1 Nov. 11, 2021

(30) Foreign Application Priority Data
Oct. 11, 2018 (EP) .................................. 18382730

(51) Int. Cl.
| C08G 64/30 | (2006.01) |
| C08G 64/14 | (2006.01) |
| B01J 19/24 | (2006.01) |
| C08G 64/20 | (2006.01) |
| C08L 69/00 | (2006.01) |

(52) U.S. Cl.
CPC ............ C08G 64/14 (2013.01); B01J 19/245 (2013.01); C08G 64/205 (2013.01); C08G 64/307 (2013.01); C08L 69/00 (2013.01); C08G 2115/00 (2021.01); C08G 2390/00 (2013.01); C08L 2203/30 (2013.01)

(58) Field of Classification Search
None
See application file for complete search history.

(56) References Cited

U.S. PATENT DOCUMENTS

| 4,624,986 A * | 11/1986 | Weber .................... C08L 69/005 525/92 E |
| 6,022,943 A | 2/2000 | Inoue et al. |
| 6,262,218 B1 | 7/2001 | Inoue et al. |
| 6,277,946 B1 * | 8/2001 | van Heijkant ......... G11B 7/253 528/196 |
| 6,548,623 B2 | 4/2003 | Brunelle et al. |
| 6,620,902 B2 | 9/2003 | Shimoda et al. |
| 7,498,400 B2 | 3/2009 | Jansen et al. |
| 10,106,648 B2 | 10/2018 | Fernandez |
| 2003/0050427 A1 * | 3/2003 | Brunelle ................ C08G 64/06 528/196 |
| 2003/0105271 A1 | 6/2003 | Brack et al. |
| 2008/0004417 A1 | 1/2008 | Jansen et al. |
| 2008/0004418 A1 | 1/2008 | Jansen et al. |
| 2009/0027726 A1 | 1/2009 | Kajikawa |
| 2009/0247726 A1 | 10/2009 | Brack et al. |
| 2017/0313815 A1 | 11/2017 | Fernandez |
| 2021/0347938 A1 | 11/2021 | Vic Fernandez |

FOREIGN PATENT DOCUMENTS

| CN | 101448872 A | 6/2009 |
| EP | 1412411 B1 | 8/2006 |
| EP | 1360220 B1 | 1/2007 |
| EP | 2174970 A1 | 4/2010 |
| EP | 2947110 A1 | 11/2015 |
| WO | 03010218 A1 | 2/2003 |
| WO | 2004033530 A1 | 4/2004 |
| WO | 2011120921 A1 | 10/2011 |
| WO | 2015155737 A1 | 10/2015 |
| WO | 2016079706 A1 | 5/2016 |
| WO | 2017145075 A1 | 8/2017 |
| WO | 2017145076 A1 | 8/2017 |
| WO | 2020074983 A1 | 4/2020 |

OTHER PUBLICATIONS

Covestro Makrolon Product Range brochure (2018) pp. 1-32. (Year: 2018).*
International Search Report; International Application No. PCT/IB2019/057716; International Filing Date: Sep. 12, 2019; dated Nov. 7, 2019; 3 pages.
Written Opinion; International Application No. PCT/IB2019/057716; International Filing Date: Sep. 12, 2019; dated Nov. 7, 2019; 6 pages.

* cited by examiner

Primary Examiner — David J Buttner
(74) Attorney, Agent, or Firm — CANTOR COLBURN LLP (57) ABSTRACT The present invention relates to an aromatic polycarbonate obtained via the melt transesterification of a diaryl carbonate, a bisphenol and an endcapping agent selected from paracumyl phenol, dicumyl phenol, p-tert-butyl phenol and mixtures of at least two of said endcapping agents, said polycarbonate having a melt volume rate of at least 20 cm³/10 min (ISO 1133, 300° C., 1.2 kg), a terminal hydroxyl group content of at most 800 ppm by weight, a Fries branching content of at most 1300 ppm by weight and a content of bulky end groups of at least 20 mol % defined as the sum of the mol % of end-groups based on said bisphenol and the mol % of end-groups based on said endcapping agent.

2 Claims, 4 Drawing Sheets

POLYCARBONATE

CROSS REFERENCE TO RELATED APPLICATIONS

This application a national stage application of International Application No. PCT/IB2019/057716, filed Sep. 12, 2019, which claims priority to European Application No. 18382730.2, filed Oct. 11, 2018, both of which are incorporated by reference in their entirety.

TECHNICAL FIELD

The present invention relates to an Aromatic polycarbonate obtained via the melt transesterification of a diaryl carbonate, a bisphenol and an endcapping agent selected from paracumyl phenol, dicumyl phenol and tert-butyl phenol.

BACKGROUND

Polycarbonate is a well-known material and generally exhibits good mechanical and optical properties. Typical applications include optical media carriers, glazing, extruded sheets, lenses and water bottles.

Polycarbonates are generally manufactured using two different technologies.

In a first technology, known as the interfacial technology or interfacial process, phosgene is reacted with bisphenol A (BPA) in a liquid phase. In the said process the polycarbonate chains will grow, i.e. the molecular weight increases, until the reaction is stopped by means of addition of a chain terminating agent, also referred to as end-capping agent. Typically such end-capping agents are mono-hydroxy compounds such for example phenol. Due to the nature of the interfacial technology end-capping levels of the polycarbonate are very high, which means that the polycarbonate obtained via the interfacial technology will have a relatively low amount of terminal hydroxyl groups at the end of the polycarbonate chains. As a consequence such polycarbonates generally have very good long term heat stability. Depending on the end-capping agent the impact performance, in particular the brittle-ductile transition temperature can be set a desired level.

Another well-known technology for the manufacture of polycarbonate is the so called melt technology, sometimes also referred to as melt transesterification or melt polycondensation technology. In the melt technology, or melt process, a bisphenol, typically BPA, is reacted with a carbonate, typically diphenyl carbonate (DPC), in the melt phase. The reaction between DPC and BPA releases phenol which needs to be removed from the reaction mixture in order to progress the polymerisation reaction. Typically the melt process is carried out in a number of stages with increasing temperatures and decreasing pressures until a desired molecular weight is obtained. Due to the nature of the melt process the resulting polycarbonate typically has a significantly higher amount of terminal hydroxyl groups, so that the obtained polycarbonate, in comparison with the interfacially manufactured polycarbonate, has a lower long term heat stability performance. Due to the end groups originating from BPA monomer, the impact properties, in particular the brittle-ductile transition is however acceptable.

End-capping of polycarbonate in the melt process is known per se and disclosed in several publications.

WO2016/079706 discloses a melt polymerization process comprising melt polymerizing a carbonate compound and a dihydroxy compound in the presence of a catalyst composition to form a polycarbonate; and adding an end-capping agent comprising a mono-phenolic compound to the polycarbonate, wherein the adding of the end-capping agent comprises at least one of adding the end-capping agent just upstream of a final polymerization unit, adding the end-capping agent directly into the final polymerization unit, and adding the end-capping agent downstream of the final polymerization unit; wherein a molecular weight of the polycarbonate increases by less than 10% downstream of the final polymerization unit. This reference discloses suitable end-capping agents to be phenol, p-cumyl-phenol (PCP), dicumyl phenol (DCP), resorcinol monobenzoate, p-butyl phenol, tertiary-butyl phenol, p-methoxyphenol, a 4-substituted-2-hydroxybenzophenone, an aryl salicylate, a 2-(2-hydroxyaryl)benzotriazole, a 2-(2-hydroxyaryl)-1,3,5-triazine, or a combination comprising one or more of the foregoing. In WO2016/079706 the end-capping agent is added near a final stage of the process.

EP1360220 discloses a process for the production of an aromatic polycarbonate, the process comprising adding to a polycarbonate oligomer reaction mixture under melt conditions an amount of a terminal blocking agent of the following formula:

to form a polycarbonate having an increased level of capped or blocked hydroxy groups, wherein at least 80% of the blocking agent is added after the oligomer has reached a number-average molecular weight, Mn, of about 2,500 to 15,000 Dalton, and wherein $R_1$ is a propoxy or butoxy and $R_2$ is selected from the group consisting of $C_1$-$C_{30}$ alkyl, $C_1$-$C_{30}$ alkoxy, $C_6$-$C_{30}$ aryl, $C_7$-$C_{30}$ aralkyl, and $C_6$-$C_{30}$ aryloxy.

EP1412411 discloses a process for preparing an end-capped polycarbonate comprising melt reacting an aromatic dihydroxy compound, a carbonic acid diester, and optionally a catalyst in a prepolymerization vessel to form a polycarbonate product; transferring said polycarbonate product from said prepolymerization vessel; mixing said polycarbonate product with an end-capping agent under hermetic seal at a pressure of at least about 760 mm Hg in a hermetically sealed mixing drum or a static mixer in fluid communication with said prepolymerization vessel and a postpolymerization vessel; transferring said polycarbonate product and end-capping agent to said postpolymerization vessel to endcap said polycarbonate product.

A concern with the use of end-capping agents, or end-cappers, having a single phenolic hydroxy group is that these may terminate a growing polycarbonate chain, but may also break the chain. As a result, adding such end-capping agents slows down chain growth and affects the formation of high molecular weight polycarbonate. The principle of chain breakage by DPC or phenol is disclosed for example in EP2947110.

WO 2017/145075 discloses a composition comprising a melt polycarbonate resin derived from diphenyl carbonate; and an interfacial polycarbonate resin mixed with the melt polycarbonate resin, wherein the composition exhibits a melt volume rate of between about 20 cm³/10 minutes and about 30 cm³/10 minutes at 1.2 kg and 300° C., wherein an article formed from the composition exhibits an IZOD Notched Impact performance that is greater than an IZOD Notched Impact performance of an article formed from a comparator composition consisting essentially of the melt polycarbonate resin within the ductile to brittle transition temperature range of the composition and the comparator composition. According to WO 2017/145075 the addition of certain endcapped polycarbonate prepared with the interfacial process to polycarbonate prepared from bisphenol A and diphenyl carbonate using the melt process allows a reduction in the ductile brittle transition. The manufacture of such polycarbonate compositions is however cumbersome as it requires an additional manufacturing step that involves subjecting one or both the polycarbonates to an additional heating step. Accordingly the process proposed in WO 2017/145075 is disadvantageous from a manufacturing cost perspective and overall product quality may be affected as a result of the additional heating step.

WO 2017/145076 discloses an article formed from a composition comprising a melt polycarbonate resin derived from diphenyl carbonate; and an interfacial polycarbonate resin mixed with the melt polycarbonate resin, wherein the composition exhibits a melt volume rate of between about 20 cm³/10 minutes and about 30 cm³/10 minutes at 1.2 kg and 300° C., and wherein the article formed from the composition exhibits an IZOD Notched Impact performance that is greater than an IZOD Notched Impact performance of an article formed from a comparator composition consisting essentially of the melt polycarbonate resin within the ductile to brittle transition temperature range of the composition and the comparator composition.

US 2008/0004417 discloses a method for preparing a polycarbonate comprising reacting a dihydroxy reaction component comprising a dihydroxy compound with carbonate reaction component comprising an activated diaryl carbonate in the presence of an esterification catalyst to produce a polycarbonate, wherein carbonate reaction component and the dihydroxy reaction component are reacted in a molar ratio of less than 1 when expressed to at least three decimal places.

It is an object of the invention to provide a polycarbonate obtained by the melt process, having in combination a high molecular weight and a high endcap level. More specifically it is an object of the present invention to provide a polycarbonate having in combination a high molecular weight, high endcap level, low amount of Fries branching and good impact properties such as a low ductile-brittle transition temperature.

BRIEF SUMMARY

In an aspect, an aromatic polycarbonate obtained via the melt transesterification of a diaryl carbonate, a bisphenol and an endcapping agent selected from paracumyl phenol, dicumyl phenol, p-tert-butyl phenol and mixtures of at least two of said endcapping agents, said polycarbonate having a melt volume rate of at least 20 cm³/10 min determined in accordance with ISO 1133 (300° C., 1.2 kg), a terminal hydroxyl group content of at most 800 ppm by weight, a Fries branching content of at most 1300 ppm by weight, and a content of bulky end groups of at least 20 mol % defined as the sum of the mol % of end-groups based on said bisphenol and the mol % of end-groups based on said endcapping agent.

DETAILED DESCRIPTION

The present inventors found that a sufficiently high molecular weight polycarbonate having a desirable endcap level can be obtained using a multi-stage melt transesterification method wherein the end-capping agent is already added in an early stage of the said multi-stage process. The present inventors further found that the specific end-capping agent results in so called bulky end groups, the presence of which is beneficial for obtaining a polycarbonate having a low brittle-ductile transition temperature.

Accordingly the present invention relates to an aromatic polycarbonate obtained via the melt transesterification of a diaryl carbonate, a bisphenol and an endcapping agent selected from paracumyl phenol, dicumyl phenol, p-tert-butyl phenol and mixtures of at least two of said endcapping agents, said polycarbonate having
    a melt volume rate of at least 20 cm3/10 min determined in accordance with ISO 1133 (300° C., 1.2 kg)
    a terminal hydroxyl group content of at most 800 ppm by weight
    a Fries branching content of at most 1300 ppm by weight
    a content of bulky end groups of at least 20 mol % defined as the sum of the mol % of end-groups based on said bisphenol and the mol % of end-groups based on said endcapping agent.

The content of said bulky end groups is preferably from 20-85 mol %, such as from 40-85 mol % preferably from 50-80 mol %.

A polycarbonate obtained by the melt transesterification process is known to be structurally different from polycarbonate obtained by the interfacial process. In that respect it is noted that in particular the so called "melt polycarbonate" typically has a minimum amount of Fries branching, which is generally absent in "interfacial polycarbonate".

In view of the difference between these two processes also the terminal hydroxyl group content typically differs. In the interfacial process typically all of the terminal hydroxyl groups can be end-capped with an endcapping agent so that the terminal hydroxyl group content for interfacial polycarbonate can be as low as 0 ppm. On the other hand the melt polycarbonate process typically allows terminal hydroxyl group contents of at least about 150 ppm, at least 200 or at least 250 ppm.

End-Capping Agent

The end-capping agent is selected from paracumyl phenol, dicumyl phenol, p-tert-butyl phenol and mixtures of at least two of said end-capping agents. The end-capping agents result in polymer chains that have so-called bulky end groups, meaning end-groups that due to sp3 hybridisation take a certain volume. The present inventors found that, compared to polycarbonates having, for example, phenolic hydroxy groups as the chain end, polycarbonates with such bulky end groups result in a lower brittle-ductile transition temperature, which is generally preferred for polycarbonate or polycarbonate containing compositions.

The amount of end-capping agent to be employed depends on the exact location and conditions of where the end-capping agent is introduced into the process and further on the type and the desired level of end-capping of the polycarbonate. In the melt process phenol is removed from the reaction mixture in at least some of the stages and depending on the type of end-capping agent a certain amount thereof may be extracted from the reaction mixture along with the phenol. Thus, the amount of end-capping agent needs to be adjusted in view of these undesired losses, if any. Generally however the amount of end-capping agent added to the process is at a stoichiometric ratio of about between 0.1 and 6.5 relative to the terminal OH content of the polycarbonate oligomer or polymer to which it is added. Typically the end-capping agent is added at a ratio of about 0.2 to 1.5, preferably from 0.4 to 0.7 relative to the free OH that would be obtained in the final targeted molecular weight of the polycarbonate and no other end-capper is used. It is preferred that the amount of chain ends that are end-capped with the end-capping agent is preferably at least 20% (mol %) on the basis of the total amount of end-groups.

In that respect it is preferred that the polycarbonate has an endcap level of at least 80%, more preferably from 80%-98% wherein the endcap level is defined as the percentage of polycarbonate chain ends which are not hydroxyl groups. Thus a polycarbonate having and endcap level of 80% means that the polycarbonate has 20% of chain ends that are phenolic OH end groups, usually resulting from the bisphenol A monomer. The other 80% of end groups do not contain a OH end group and may be phenolic (usually originating from the diphenylcarbonate) or correspond to the end capping agent molecule(s). The amount of chain ends that are end-capped with the end-capping agent is preferably at least 20% on the basis of the total amount of end-groups.

The endcap level is calculated with the following formula $$\%EC = 100 - \left(\frac{ppmOH \times Mn}{340000}\right)$$

wherein % EC is the endcap level, ppmOH is the amount of hydroxyl end groups in parts per million by weight and Mn is the number average molecular weight of the polycarbonate based on polycarbonate standards.

Thus, the endcap level is defined as the mole percentage of end-groups of the polycarbonate that is not a hydroxyl group and can be calculated from the amount of terminal OH groups in the polycarbonate and the number average molecular weight (Mn).

Polycarbonate

It is preferred that the polycarbonate has a weight average molecular weight, Mw, of at least 30,000 Daltons (Da), determined on the basis of polystyrene standards. The maximum molecular weight depends on the chosen reaction conditions, like temperature, pressure, residence time DPC/BPA ratio and amount of end-capping agent. Generally however the Mw may be from 30,000 to 60,000 Daltons, preferably from 35,000 to 50,000 Daltons, such as from 35,000 to 45,000 Daltons. A particularly preferred range is from 42,000 to 46,000 g/mol.

The melt volume rate of the polycarbonate is preferably at most 50 cm$^3$/10 min, preferably from 18-45 cm$^3$/10 min, more preferably from 22-40 cm$^3$/10 min, even more preferably from 26-40 cm$^3$/10 min as determined in accordance with ISO 1133 (300° C., 1.2 kg).

The polycarbonate is an aromatic polycarbonate obtained by reacting a bisphenol and a diarylcarbonate, where the bisphenol is preferably bisphenol A (BPA) and the diarylcarbonate is preferably diphenyl carbonate (DPC).

In a preferred embodiment the polycarbonate is obtained by reacting BPA and DPC as the monomers. Paracumyl phenol is the preferred the endcapping agent, in particular in combination with BPA and DPC as the monomers.

The polycarbonate is preferably a linear polycarbonate meaning that the melt transesterification was carried out on the basis of the bisphenol and diarylcarbonate in absence of any branching agent, such as for example multi-functional alcohols. Notwithstanding the foregoing it is well known that the melt transesterification process for the manufacture of polycarbonate, wherein bisphenol A and diphenyl carbonate are reacted in molten conditions thereby releasing phenol, results in a certain amount of branching, known as Fries branching. The amount of Fries branching depends inter alia on the type and amount of transesterification catalyst that is used as well as the reaction conditions that are applied, in particular the temperature, pressure and residence times. Thus a linear polycarbonate in the context of the present invention will contain a certain amount of Fries branching. It is however to be understood that the polycarbonate in the present invention is preferably manufactured in absence of a branching agent, i.e. an agent that includes three or more functional groups and thereby introduces branching or crosslinking of the polycarbonate.

The amount of Fries branching is at most 1500 ppm, preferably at most 1300 ppm, more preferably at most 1300 ppm. Typical lower limits are 50, 100, 200 or 300 ppm. A preferred amount of Fries branching is from 300-1000 ppm. The term Fries branching is known to the skilled person and refers inter alia to the structures as disclosed in EP2174970, yet may include further branched structures. EP 2174970 discloses an aromatic polycarbonate resin which is obtainable from an ester exchange reaction of an aromatic dihydroxy compound and a carbonic acid diester, and satisfies such the following conditions (1) to (3) that:
(1) viscosity-average molecular weight is 13,000 to 30,000;
(2) the amount of the residual aromatic monohydroxy compound and the amount of the residual aromatic dihydroxy compound in the resin are each not more than 20 ppm; and
(3) the resin contains at least one of the structural units of the following formulae (1) to (5), with the total amount of such structural units being 1,000 to 6,000 ppm:

(1)

The polycarbonate resins according to this patent application find useful application to the construction materials such as sheeting, containers such as water bottle, head lamp lens for automobiles, optical lens for glasses, optical recording materials such as optical disc, photoconductive plates such as liquid crystal display, and such.

Fries branching is typical to the melt process for the manufacture of polycarbonate and depends inter alia on the reaction conditions like temperature, pressure and residence time as well as the type and amount of catalyst that is used in said process. High levels of Fries branching may make the polycarbonate more brittle and/or may affect the color and color stability of the polycarbonate, both of which are generally not desirable. WO 2011/120921 discloses that units such as disclosed in EP 217940 are Fries branching species. Methods for determining the amount of Fries branching are known to the skilled person and generally include the methanolysis of the polycarbonate followed by high performance liquid chromatography (HPLC) to identify the total amount of Fries structures. In addition nuclear magnetic resonance (NMR) techniques can be used to determine the type and amount of these Fries structures, such as the respective amounts of linear and branched Fries structures.

The polycarbonate prepared with the method of the invention preferably has a brittle-ductile transition temperature that is at least 5° C. lower compared to an otherwise identical polycarbonate, in particular having the same molecular weight, and prepared in absence of the end-capping agent.

Process-Stages

The method for the manufacture of the polycarbonate is preferably a multi-stage process for the manufacture of polycarbonate comprising a monomer mixing stage, an oligomerisation stage and a polymerisation stage. The process may however include further stages such as in particular a finishing stage where the polycarbonate obtained from the polymerisation stage is fed to an extruder, optionally mixed with additives such as for example stabilisers or catalyst quenchers, extruded to strands which are consecutively cut into pellets.

Figure 1:
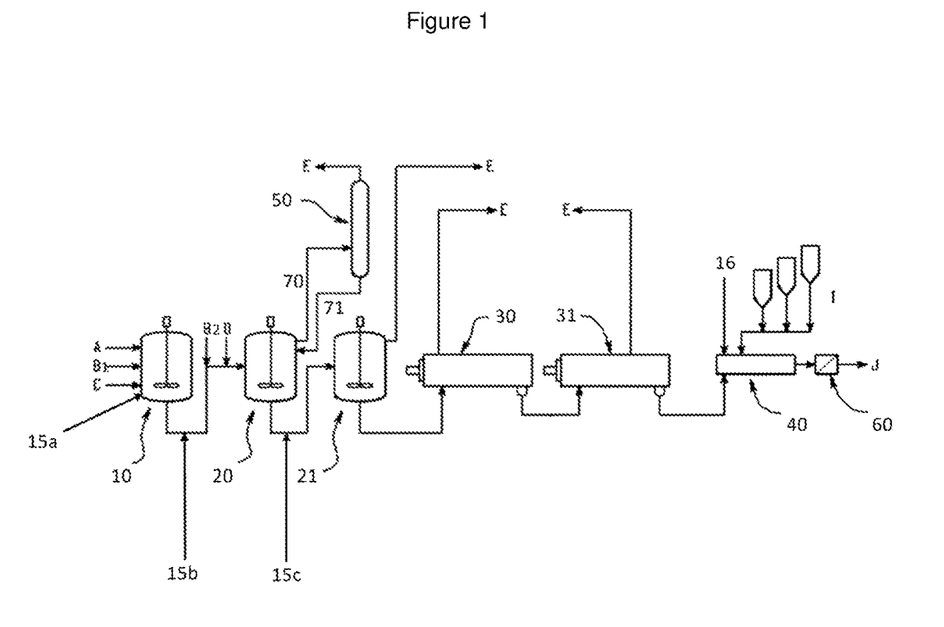
FIG. 1 is an illustration of an apparatus for polymerizing polycarbonate.

The process will now be further elaborated with reference to FIG. 1, which is however not to be considered as limiting the present invention.

The monomer mixing stage comprises the mixing of the monomers, i.e. the bisphenol and diaryl carbonate, or more specifically the BPA and DPC. The plant for the manufacture of polycarbonate may part of an integrated site and the BPA and DPC may come directly from the plants on-site and producing the said monomers either in solid or in molten form. The invention is however not limited to such an embodiment and BPA and DPC may also be obtained from external sources and added to the equipment in the monomer mixing stage using appropriate feeding equipment and upon application of any optional pre-treatment such as melting, filtering, purification, solvent removal etcetera.

With reference to FIG. 1, BPA and DPC are added as streams A and B1 respectively to monomer mixing device 10. The DPC to BPA ratio in the monomer mixing device is kept fixed. A beta catalyst is added to monomer mixing device 10 via stream C. The monomer mixing device is equipped with a suitable stirrer so as to guarantee an even concentration of the components in the device. Monomer mixing device 10 can be maintained at a temperature of from 160 to 180° C. and at substantially atmospheric pressure. The stream exiting monomer mixing device 10 is fed to a first oligomerisation reactor 20. For reasons of process flexibility an additional amount of DPC may be added as stream B2. An alpha catalyst is added as a stream D. This monomer mixture is then fed to oligomerisation reactor 20 of the oligomerisation stage.

Oligomerisation reactor 20 operates at a temperature of from 230 to 260° C. and a pressure of from 140 to 200 millibar. An overhead stream comprising phenol byproduct and optionally monomers or other low molecular weight reaction products is removed via stream 70 and fed to column 50, which separates the phenol from the stream. The phenol is then removed via top stream E for further purification and/or use, while the bottom stream is fed back to reactor 20 as stream 71. The mixture exiting reactor 20 is fed to a second oligomerisation reactor 21 for further reaction. Second oligomerisation reactor 21 operates at temperature of from 270 to 290° C. and a pressure of from 30 to 50 millibar. Phenol byproduct is removed from second reactor 21 as a stream E.

Oligomerisation reactors 20 and 21 constitute the oligomerisation stage, resulting in a stream of polycarbonate oligomer which is fed to first polymerisation reactor 30 and then to second polymerisation reactor 31. Reactor 30 operates at a temperature of from 290 to 315° C. and a pressure of 1 to 5 millibar. The stream from the first polymerisation reactor 30 is then fed to a second polymerisation reactor 31 that operates at temperature of from 290 to 315° C. and a pressure of from 0.3 to 1.5 millibar. The temperature in reactor 31 is generally higher than in reactor 30 and the pressure in reactor 31 is generally lower than the pressure in reactor 30. Similar to the oligomerisation stage phenol byproduct is removed from the reactors 30 and 31. Polymerisation reactors 30 and 31 together constitute the polymerisation stage.

In the process according to the invention an end-capping agent can be added through one or more of streams 15a, 15b and 15c. Despite it being technically possible and feasible, it is preferred that no end-capping agent is fed to monomer mixing device 10. Stream 15c is drawn in FIG. 1 as being positioned before addition to the mixture exiting device 10 of streams B and D and before entering into first oligomerisation reactor 20. However, the exact position for that feed is not critical and may also be located after or in-between streams B and D. The streams B, D and 15c may even be combined into a single stream. Similarly, although less preferred, the stream 15a may be fed directly into oligomerisation reactor 20. Stream 15c may be combined with the stream leaving oligomerisation reactor 20 before said stream enters second oligomerisation reactor 21. Alternatively stream 15c may be added directly into reactor 21.

Streams 15a, 15b and 15c may be used in combination and may feed portions of the same or different types of endcapping agents. For example the end-capping agent that enters reactor 20 may be different from the end-capping agent that enters reactor 21. The individual streams 15a, 15b and 15c may also each contain a mixture of end-capping agents, and each mixture may be the same or different in composition.

The polymer exiting second polymerisation reactor 31 is fed to extruder 40 where it is combined with one or more additives, indicated with I. Also, a stream of catalyst deactivator, or catalyst quencher is added via stream 16. The extruded stream is passed through a melt filter 60 and then extruded to strands and cut to pellets. For the avoidance of doubt it is noted that the position for addition of catalyst quencher is not limited to stream 16 and other positions may be equally suitable.

It is noted that while FIG. 1 illustrates polymerisation reactors 30 and 31 to be horizontal polymerisation units, these reactors may likewise each independently be, for example, a wire wetting fall polymerisation unit or a continuously stirred tank.

The process indicated in FIG. 1 is shown as a single production line. It is however possible that at any point during the process the line is split into two or more parallel lines wherein each line operates at the same or different conditions including monomer mixture composition, temperature, pressure residence time etc. By way of example the stream exiting oligomerisation reactor 21 may be split into two or more different streams after which each stream is polymerised in one or more polymerisation reactors using, by way of example, different conditions resulting in the parallel manufacture of different grades of polycarbonate. Another possibility is to split the stream exiting the final polymerisation reactor 31 and then to feed the polycarbonate stream to different extruders. An option in such embodiment is to add a chain scission agent via stream 16 and/or to use different additives in the extruder so as to manufacture different grades in parallel. Finally the monomer mixing device may supply any number of oligomerisation and polymerisation lines.

Typical additives that are used in polycarbonate can comprise one or more of an impact modifier, flow modifier, filler, reinforcing agent (e.g., glass fibers or talc), antioxidant, heat stabilizer, light stabilizer, UV light stabilizer and/or UV absorbing additive, plasticizer, lubricant, release agent, in particular glycerol monostearate, pentaerythritol tetra stearate, glycerol tristearate, stearyl stearate, antistatic agent, antifog agent, antimicrobial agent, colorant (e.g., a dye or pigment), flame retardant either or not combined with an anti-drip agent such as polytetrafluoroethylene (PTFE) or PTFE-encapsulated styrene-acrylonitrile copolymer.

Apart from the specific configuration shown in FIG. 1 the polycarbonate may be manufactured under one or more of the following preferred conditions.

It is preferred that the monomer mixing stage comprises addition of a beta catalyst wherein the beta catalyst is a quaternary ammonium or quaternary phosphonium compound or a mixture thereof.

Beta Catalyst

The quaternary ammonium compound can be organic ammonium compound(s) having structure, $(R_1)_4N^+X^-$, wherein each R1 is the same or different, and is a $C_1$-$C_{20}$ alkyl, a $C_4$-$C_{20}$ cycloalkyl, or a $C_6$-$C_{20}$ aryl; and $X^-$ is an organic or inorganic anion, for example, a hydroxide, halide, carboxylate, sulfonate, sulfate, formate, carbonate, or bicarbonate. Some non-limiting examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising two or more of the foregoing. Tetramethyl ammonium hydroxide is often employed.

The quaternary phosphonium compound can be of organic phosphonium compounds having structure, $(R_2)_4P^+ X^-$, wherein each $R_2$ is the same or different, and is a $C_{1-20}$ alkyl, a $C_4$-$C_{20}$ cycloalkyl, or a $C_6$-$C_{20}$ aryl; and $X^-$ is an organic or inorganic anion, for example, a hydroxide, phenoxide, halide, carboxylate such as acetate or formate, sulfonate, sulfate, formate, carbonate, or bicarbonate. Where $X^-$ is a polyvalent anion such as carbonate or sulfate, it is understood that the positive and negative charges in the quaternary ammonium and phosphonium structures are properly balanced. For example, where each $R_2$ are independently methyl groups and $X-$ is carbonate, it is understood that $X^-$ represents $2(CO_3^{2-})$.

Examples of organic quaternary phosphonium compounds include tetramethyl phosphonium hydroxide, tetramethyl phosphonium acetate, tetramethyl phosphonium formate, tetrabutyl phosphonium hydroxide, tetraphenyl phosphonium acetate (TPPA), tetraphenyl phosphonium phenoxide (TPPP), tetraethyl phosphonium acetate, tetrapropyl phosphonium acetate, tetrabutyl phosphonium acetate (TBPA), tetrapentyl phosphonium acetate, tetrahexyl phosphonium acetate, tetraheptyl phosphonium acetate, tetraoctyl phosphonium acetate, tetradecyl phosphonium acetate, tetradodecyl phosphonium acetate, tetratolyl phosphonium acetate, tetramethyl phosphonium benzoate, tetraethyl phosphonium benzoate, tetrapropyl phosphonium benzoate, tetraphenyl phosphonium benzoate, tetraethyl phosphonium formate, tetrapropyl phosphonium formate, tetraphenyl phosphonium formate, tetramethyl phosphonium propionate, tetraethyl phosphonium propionate, tetrapropyl phosphonium propionate, tetramethyl phosphonium butyrate, tetraethyl phosphonium butyrate, and tetrapropyl phosphonium butyrate, and combinations comprising two or more of the foregoing.

The quaternary catalyst can comprise TPPP, TPPA, TBPA or a combination comprising one or both of the foregoing. In a preferred embodiment the beta catalyst, i.e. the quaternary catalyst, is tetrabutyl phosphonium acetate (TBPA).

The amount of quaternary catalyst employed is typically based upon the total number of moles of dihydroxy compound employed in the polymerisation reaction. When referring to the ratio of quaternary catalyst, for example, phosphonium salt, to all dihydroxy compounds employed in the polymerisation reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of beta catalyst, i.e. quaternary catalyst (e.g., organic ammonium or phosphonium salts) employed typically will be from $1\times10^{-2}$ to $1\times10^{-5}$, specifically from $1\times10^{-3}$ to $1\times10^{-4}$ moles per total mole of the dihydroxy compounds in the reaction mixture.

The quaternary catalyst is preferably free of metal compounds, which may be present as impurities. In particular, the quaternary catalyst comprises at most 500 ppm preferably at most 50 ppm of sodium and at most 100, preferably at most 50 ppm of potassium, based on the total weight of the quaternary catalyst.

The quaternary catalyst can be added just upstream of and/or directly into a monomer mixing device and/or into an oligomerisation reactor.

Alpha Catalyst

The alpha catalyst, which is an alkali containing catalyst comprises a source of one or both of alkali ions and alkaline earth ions. The sources of these ions can include alkaline earth hydroxides such as magnesium hydroxide and calcium hydroxide. Sources of alkali metal ions can include the alkali metal hydroxides such as lithium hydroxide, sodium hydroxide, potassium hydroxide, and combinations comprising two or more of the foregoing. Examples of alkaline earth metal hydroxides are calcium hydroxide, magnesium hydroxide, and combinations comprising two or more of the foregoing. The alkali catalyst can comprise sodium hydroxide. The alkali catalyst typically will be used in an amount sufficient to provide from $1\times10^{-2}$ to $1\times10^{-8}$ moles, specifically from $1\times10^{-4}$ to $1\times10^{-7}$ moles of metal hydroxide per mole of the dihydroxy compounds employed.

Other possible sources of alkaline earth and alkali metal ions include salts of carboxylic acids (such as sodium acetate) and derivatives of ethylene diamine tetra-acetic acid (EDTA) (such as EDTA tetra-sodium salt, and EDTA magnesium disodium salt), as well as combinations comprising at least one of the foregoing. For example, the alkali catalyst can comprise alkali metal salt(s) of a carboxylic acid, alkaline earth metal salt(s) of a carboxylic acid, or a combination comprising at least one of the foregoing. In another example, the alkali catalyst comprises $Na_2Mg$ EDTA or a salt thereof.

The alkali catalyst can also, or alternatively, comprise salt(s) of a non-volatile inorganic acid. For example, the alkali catalyst can comprise salt(s) of a non-volatile inorganic acid such as $NaH_2PO_3$, $NaH_2PO_4$, $Na_2HPO_3$, $KH_2PO_4$, $CsH_2PO_4$, $Cs_2HPO_4$, and combinations comprising two or more of the foregoing. Alternatively, or in addition, the alkali catalyst can comprise mixed alkali metal salt(s) of phosphoric acid, such as $NaKHPO_4$, $CsNaHPO_4$, $CsKHPO_4$, and combinations comprising two or more of the foregoing. The alkali catalyst can comprise KNaHPO4, wherein a molar ratio of Na to K is 0.5 to 2.

The alkali catalyst is preferably added downstream of the monomer mixing device and can be added for example upstream of and/or directly to the one or more oligomerisation and/or polymerisation reactors.

Alkali catalysts, i.e. alpha catalysts, are transesterification catalysts that are typically more thermally stable than quaternary catalysts, i.e. beta catalysts, and therefore can be used throughout transesterification, including during oligomerisation, and after oligomerisation, e.g., in the polymerisation reactors, during polymerisation. Nearly all of the alkali catalyst (e.g., greater than 80 wt. %, specifically greater than 90 wt. %) survives the polymerisation process. As such, this catalyst is available to catalyze additional and generally undesired reactions downstream of the polymerisation process, such as in the extruder. To suppress such further reactions a catalyst quencher can be added to quench the alkali catalyst. Accordingly it is preferred that the method of the invention comprises adding a quenching agent to the last of said polymerisation reactors and/or to said extruder for deactivating the catalyst, at least in part, in the polycarbonate. The quencher can comprise a sulfonic acid ester such as an alkyl sulfonic ester of the formula R3SO₃R4 wherein R3 is hydrogen, $C_1$-$C_{12}$ alkyl, $C_6$-$C_{18}$ aryl, or $C_7$-$C_{19}$ alkylaryl, and R4 is $C_1$-$C_{12}$ alkyl, $C_6$-$C_{18}$ aryl, or $C_7$-$C_{19}$ alkyl aryl. Examples of alkyl sulfonic esters include benzenesulfonate, p-toluenesulfonate, methylbenzene sulfonate, ethylbenzene sulfonate, n-butyl benzenesulfonate, octyl benzenesulfonate and phenyl benzenesulfonate, methyl p-toluenesulfonate, ethyl p-toluenesulfonate, n-butyl p-toluene sulfonate, octyl p-toluenesulfonate and phenyl p-toluenesulfonate. The sulfonic acid ester can comprise alkyl tosylates such as n-butyl tosylate. The sulfonic acid ester can be present in the quencher composition in an amount of 0.1 to 10 volume percent (vol %), specifically, 0.1 to 5 vol %, more specifically, 0.5 to 2 vol % based on the total volume of the quencher composition.

The quencher can be added in an amount of at least 5 ppm, specifically at least 10 ppm based on the total weight of the polycarbonate. The exact amount of quencher depends on the amount of alpha catalyst that is added during the process and should be sufficient to deactivate the catalyst to at least 90%. To that extent the amount of quencher that is added corresponds to 0.1 to 50 times, specifically, 0.5 to 30 times, per the neutralization equivalent of the catalyst used. The quencher composition can be added as a liquid or a solid composition at one or more locations in the melt preparation of the polycarbonate. The quencher may be part of a composition further comprising a liquid carrier, a solid carrier or a solvent.

A preferred catalyst quencher is butyl tosylate.

In an embodiment the method does not comprise the addition of an alpha catalyst and only the addition of a beta catalyst being a quaternary phosphonium compound such as in particular TPPP.

The monomer mixing stage is preferably carried out a temperature of from 100 to 250° C., specifically from 150 to 200° C., more specifically from 165 to 185° C. The pressure in the monomer mixing stage is preferably substantially atmospheric such as from 900 to 1100 mbar.

The oligomerisation stage is preferably carried out in two steps wherein in a first step the temperature is from 230 to 260° C. and the pressure is from 140 to 200 mbar, and wherein in a second step the temperature is higher than in the first step and from 260 to 290° C. and the pressure is from 30 to 50 mbar.

The weight average molecular weight of the oligomer resulting from the oligomerisation stage is preferably from at most 12,000, preferably from 8,000 to 12,000 Daltons, determined on the basis of polystyrene standards.

The polymerisation stage is preferably carried out in two steps wherein in a first step the temperature is from 290 to 315° C. and the pressure is from 1 to 5 mbar and wherein in a second step the temperature is from 290° C. to 315° C. and the pressure is from 0.3 to 1.5 mbar.

As per the exemplified process of FIG. 1, it is preferred that the oligomerisation stage consists of preparing a carbonate oligomer in two oligomerisation reactors and wherein the polymerisation stage consists of preparing the polycarbonate in two polymerisation reactors.

It is further preferred that the method comprises a step of melt filtering the polycarbonate from the last of the polymerisation reactors and the feeding said polycarbonate to a finishing extruder.

In order to obtain a sufficient amount of end-capping it is preferred that a reaction time between addition of the end-capping agent and addition of the catalyst quencher is at least 1 hour, preferably from 1.5 to 4 hours.

It is further preferred that the end-capping agent is added to a first oligomerisation reactor equipped with a separation device that separates the phenol reaction by product from the end-capping agent and wherein the end-capping agent is recycled to the said first oligomerisation reactor.

In a preferred embodiment of method of the invention the bisphenol is bisphenol A, the diaryl carbonate is diphenyl carbonate, the end-capping agent is paracumyl phenol, a beta catalyst is added in the monomer mixing stage and an alpha catalyst is added prior to feeding the monomer mixture prepared in the monomer mixing device to the first oligomerisation reactor.

In a preferred embodiment the bisphenol is bisphenol A, the diaryl carbonate is diphenyl carbonate, the end-capping agent is paracumyl phenol, the alpha catalyst is $NaKHPO_4$ and the beta catalyst is tetra-butyl phosphonium acetate.

The present invention is also directed at article comprising or consisting of the polycarbonate of the invention. Articles include in particular injection moulded articles.

The present invention is also directed at a composition comprising from 5-95% by weight of the polycarbonate as described herein and from 95-5% by weight of at least one other polymer preferably selected from polycarbonate copolymers, polyethylene terephthalate, polybutylene terephthalate, styrene acrylonitrile copolymer, styrene acrylonitrile butadiene copolymer, polyethylene, polypropylene, ethylene propylene copolymer, the weight percentage being based on the sum of the weight of the polycarbonate and the at least one other polymer. In particular the present invention relates to a composition comprising a polycarbonate manufactured on the basis of BPA and DPC as monomers and a siloxane copolymer, such as those commercially available from SABIC Innovative Plastics under the trade mark LEXAN EXL. Typically such compositions contain from 5-85 wt. % by weight of siloxane copolymer and 95-15 wt. % of polycarbonate homopolymer, on the basis of the combined weight of the polymers.

The present invention will now be further elucidated on the basis of the following non-limiting examples.

The aromatic polycarbonate disclosed herein preferably does not contain units derived from the use of activated carbonates such as for example the ester substituted diaryl carbonates disclosed in US 2008/0004417. In particular the aromatic polycarbonate disclosed herein preferably does not contain units derived from the use of bis-methyl salicyl carbonate, bis-ethyl salicyl carbonate, bis-propyl salicyl carbonate, bis-phenyl salicyl carbonate and bis-benzyl salicyl carbonate. Thus the polycarbonate of the present invention is obtained by reacting BPA and DCP as the only monomers.

Test Methods

Fries Branching:

The amount of Fries branching was determined using an Agilent 1100 series HPLC equipped with a MWD G1365B detector. The column is an Agilent Zorbax Eclipse XDB-C18 4.6×75 mm. The injection volume is 50 ml. The oven temperature is 35° C. and the wavelength to acquire data is 320.16 nm. For sample preparation 0.3 g of sample is dissolved in 7.5 ml of a solvents mixture based on 5 ml of tetrahydrofuran and 2.5 ml of a 10% of potassium hydroxide solution in methanol, after heating this sample at 40° C. during 20 min, 1.4 ml of acetic acid is added.

Molecular Weight

The molecular weight was measured by GPC method with polystyrene standard in an Agilent 1260 Infinity (SYS-LC-1260) equipment with PLGel 5 um Minimix C 250×4.6 mm column and Refractive Index detector. The sample is dissolved in dichloromethane and the same solvent is used as carrier. Based on the molecular weight determined on the basis of polystyrene standards the (number average) molecular weight needed to calculate the endcap can be calculated.

Endcap Level

The endcap level was determined on the basis of UV measurement to determine the amount of terminal OH groups. Combined with the number average molecular weight the endcap level is then determined. The UV spectrophotometer was a Perkin Elmer Lambda 800. Measurements were carried out on 0.01 g of a polycarbonate sample diluted in 10 ml of dichloromethane and placed into a quartz cuvette of 10 mm of optical path. The wavelength to acquire data are 284 and 292 nm. The results from the equipment as ppm of OH are used to calculate the endcap using also the molecular weight of the polycarbonate and according to the formula for calculation as disclosed herein.

End-Capper Concentration

The amount of polymer chains end-capped with the added end-capping agent was determined on the basis of HPLC measurement using the same procedure techniques as for the Fries branching. The amount of bulky end-groups equals the sum of the amount of OH end-groups (originating from BPA) and the amount of PCP end-groups.

Example 1

Polycarbonate was continuously produced using an apparatus as schematically shown in FIG. 1. BPA and DPC are introduced in a monomer mixing device which is kept at a temperature of 170 QC at a pressure of about 1050 mbar. 1000 ppm of tetra butyl phosphonium acetate (TBPA) was also added as a beta catalyst.

The monomer mix is then introduced in the first oligomerisation reactor operating at a temperature of 257° C. and a pressure of 180 mbar. The initial DPC/BPA ratio (molar ratio) is adjusted with additional DPC to 1.040 and an amount of $NaKHPO_4$ as alpha catalyst is added. The carbonate oligomer formed in the first oligomerisation reactor is fed to the second oligomerisation reactor operating at a temperature of 280° C. and a pressure of 37 mbar.

The so formed carbonate oligomer is then introduced to a first and second polymerisation reactor operating at 300 and 302° C., respectively. The pressure was selected to accommodate the formation of the desired molecular weight.

The residence time in the oligomerisation section was 1.8 hours (1.1. hour in the first oligomerisation reactor, 0.7 hours in the second polymerisation reactor) and the residence time in the polymerisation section was 1.0 hours (0.5 hour in each polymerisation reactor).

After polymerisation the polymer is fed to an extruder where a catalyst quencher (butyl tosylate) is added to deactivate the catalyst. The molten polymer was extruded, filtered, cooled and cut to pellets.

During the oligomerisation PCP as endcapping agent was added to the first oligomerisation reactor. In order to increase the level of PCP end-capping while maintaining the desired molecular weight, the amount of alpha catalyst was adjusted resulting in somewhat higher amount of Fries branching as shown in the Table 1 below.

In Example 1, two different polycarbonates were made with this process, indicated below as Example 1a and Example 1 b.

Example 2

Polycarbonate was produced using a process similar to Example 1, but with the difference that the end-capping agent, PCP, was added to the first polymerisation reactor. The inventors observed that at similar levels of Fries more similar levels of bulky end-groups could be obtained, yet with a somewhat lower molecular weight.

TABLE 1

| | Fries (Ppm) | PCP (%) | End Cap (%) | Mw (Da) | OH (ppm) | % Bulky endgroups |
|---|---|---|---|---|---|---|
| Ex. 1A | 985 | 1.88 | 79.5 | 40,284 | 609 | 65 |
| Ex. 1B | 1259 | 2.20 | 81.7 | 40,432 | 635 | 71 |
| Ex. 2A | 946 | 1.79 | 78.3 | 39,420 | 820 | 64 |
| Ex. 2B | 1114 | 2.20 | 77.3 | 38,450 | 845 | 76 |

Examples 3

Polycarbonate was produced using a process similar to Example 1 except that the end-capping agent, PCP, is added in the monomer mix. The target amount of Fries was set at a level of around 1000 ppm. Example 3a shows the properties of the polycarbonate prepared in this manner. Example 3b is a polycarbonate prepared with a process similar to that of Example 1, hence where the end-capping agent is added to the first oligomerisation reactor. From the results the present inventors conclude that there is no significant difference between adding the end-capping agent to the monomer mix and adding the end-capping agent directly to the first oligomerisation reactor.

Table 1. Comparison of addition of PCP in monomer mix and R1 at the same level of fries.

TABLE 2

| | Fries (Ppm) | PCP (%) | End Cap (%) | Mw (Da) | OH (ppm) | % Bulky endgroups |
|---|---|---|---|---|---|---|
| Ex. 3a | 837 | 2.07 | 83.9 | 40,010 | 600 | 66 |
| Ex. 3b | 887 | 2.05 | 84.4 | 40,675 | 568 | 65 |

Comparative Example 1

Polycarbonate was produced using a process similar to Example 1 except that the end-capping agent, PCP, is added to the second polymerisation reactor. In order to reach the desired weight average molecular weight of 40,000 Daltons the present inventors observed s strong increase in the level of Fries branching. The present inventors further found that the amount of PCP end-groups was much lower as compared to the level in Examples 1-3.

TABLE 3

| | Fries (Ppm) | PCP (%) | End Cap (%) | Mw (Da) | OH (ppm) | % Bulky endgroups |
|---|---|---|---|---|---|---|
| CE 1 | 1396 | 1.50 | 71.38 | 40,010 | 1063 | 64 |

Comparative Examples 2-5

Melt polycarbonate prepared from BPA and DPC having a MVR of 26 $cm^3$/10 min and with different levels of Fries branching were prepared to study the impact performance of the neat polycarbonate without any bulky endcapper. It was found that up to about 1000 ppm of Fries the impact performance in terms of brittle ductile transition is similar. All samples are ductile at room temperature, i.e. 23° C.

TABLE 4

| | End Cap (%) | OH (ppm) | Fries (ppm) | % Bulky endgroups |
|---|---|---|---|---|
| CE2 | 80 | 700 | 300 | 20 |
| CE3 | 79.48 | 702 | 606 | 21 |
| CE4 | 77.32 | 800 | 1000 | 22 |
| CE5 | 77.60 | 800 | 1127 | 22 |

Figure 2:
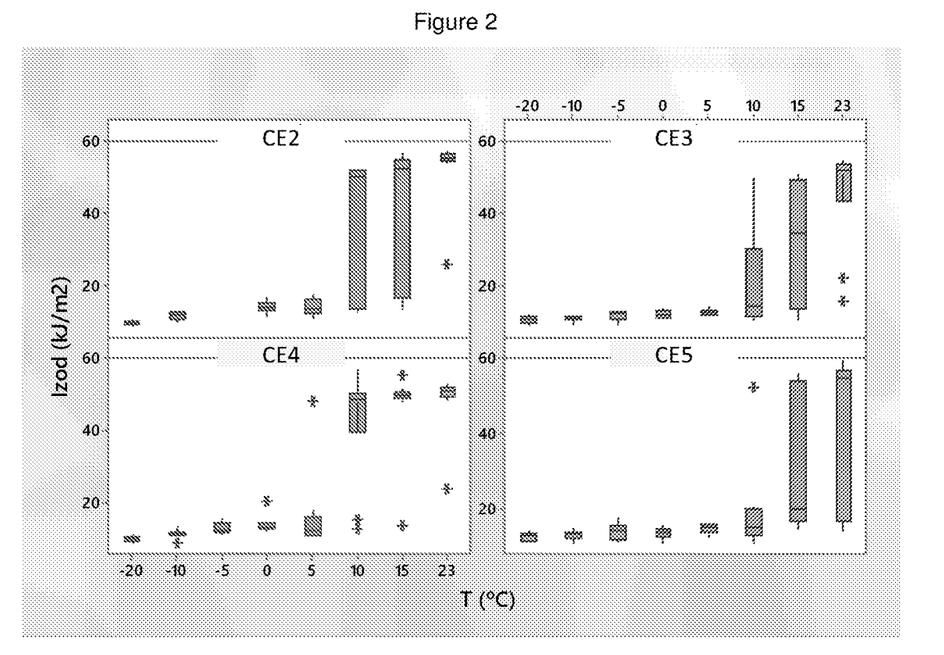
FIG. 2 is a graphical illustration of the impact behaviour (Izod impact) as a function of temperature for Comparative Examples 2-5.

FIG. 2 shows the impact behaviour (Izod impact) as a function of temperature. The horizontal axis shows the temperature whereas the vertical axis shows the Notched Izod impact strength measured on 3 mm thick samples according to ISO 180 with a pendulum energy of 5.5 J. The brittle ductile transition occurs in the range from about 5-15° C.

Examples 4 and 5

Figure 3:
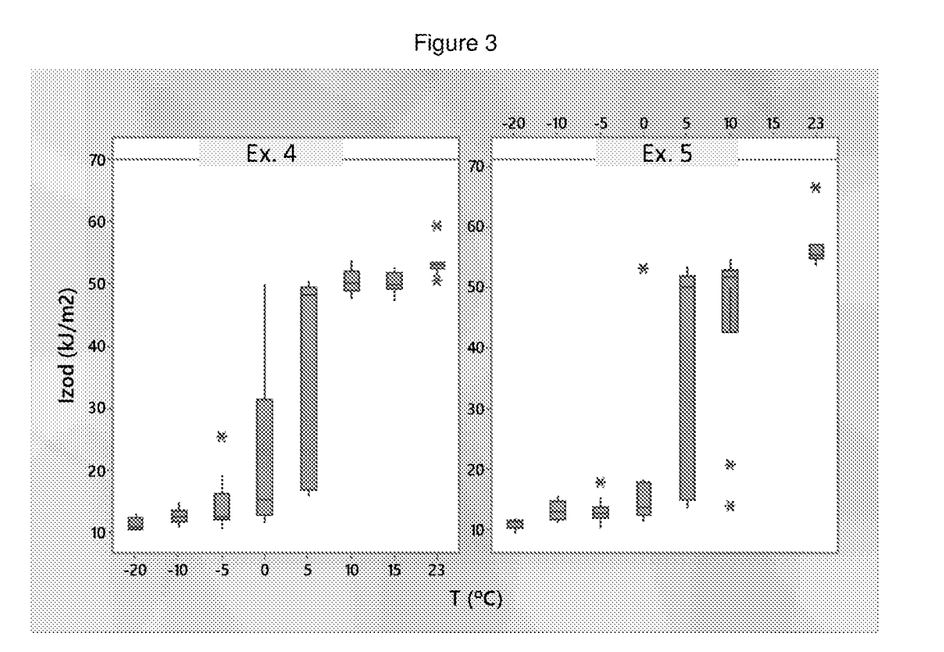
FIG. 3 is a graphical illustration of the impact behaviour (Izod impact) as a function of temperature for Examples 4 and 5.

Melt polycarbonate prepared from BPA and DPC having a MVR of 26 cm$^3$/10 min and with a Fries branching level of around 600 ppm and using PCP as endcapping agent were prepared to study the impact performance. It was found that at this level of Fries branching the brittle ductile transition decreases to around 5° C. as compared to CE3. FIG. 3 shows the impact behaviour (Izod impact) as a function of temperature.

TABLE 5

| | End Cap (%) | OH (ppm) | Fries (ppm) | % Bulky endgroups |
|---|---|---|---|---|
| Ex. 4 | 81.76 | 667 | 641 | 50 |
| Ex. 5 | 79.82 | 734 | 577 | 54 |

Examples 6-9

Melt polycarbonate prepared from BPA and DPC having a MVR of 26 cm$^3$/10 min and with a Fries branching level of around 1000 ppm and using PCP as endcapping agent were prepared to study the impact performance. It was found that at this level of Fries branching the brittle ductile transition decreases to around 5° C.-0° C.

Figure 4:
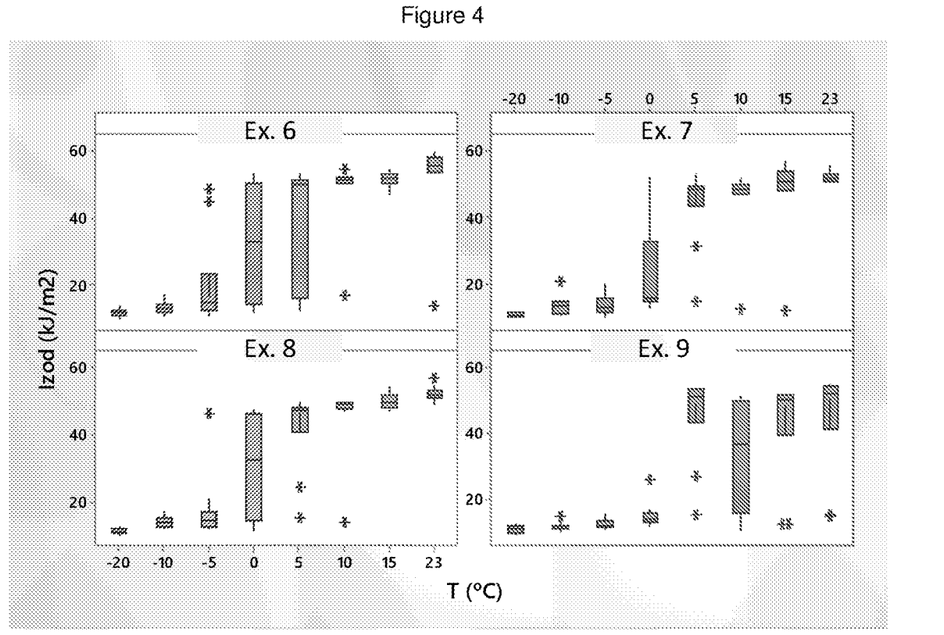
FIG. 4 is a graphical illustration of the impact behaviour (Izod impact) as a function of temperature for Examples 6-9.

FIG. 4 shows the impact behaviour (Izod impact) as a function of temperature.

TABLE 6

| | End Cap (%) | OH (ppm) | Fries (ppm) | % Bulky endgroups |
|---|---|---|---|---|
| Ex. 6 | 79.32 | 744 | 1026 | 57 |
| Ex. 7 | 79.97 | 787 | 896 | 60 |
| Ex. 8 | 80.49 | 723 | 983 | 63 |
| Ex. 9 | 78.94 | 726 | 930 | 65 |

Example 10

Figure 5:
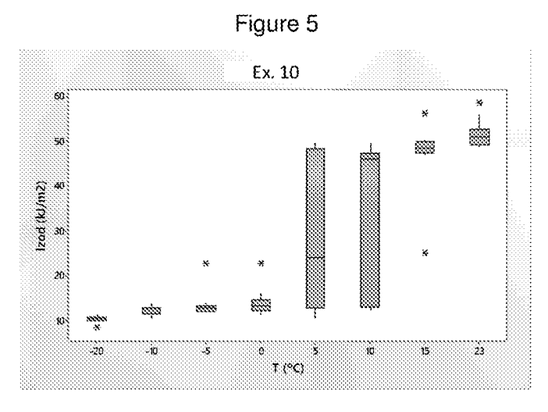
FIG. 5 is a graphical illustration of the impact behaviour (Izod impact) as a function of temperature for Example 10.

Melt polycarbonate prepared from BPA and DPC having a MVR of 26 cm$^3$/10 min and with a Fries branching level of around 1200 ppm and using PCP as endcapping agent were prepared to study the impact performance. FIG. 5 shows the impact behaviour (Izod impact) as a function of temperature.

TABLE 7

| | End Cap (%) | OH (ppm) | Fries (ppm) | % Bulky endgroups |
|---|---|---|---|---|
| Ex. 10 | 81.79 | 635 | 1256 | 71 |

Examples 11-13 and CE6

Figure 6:
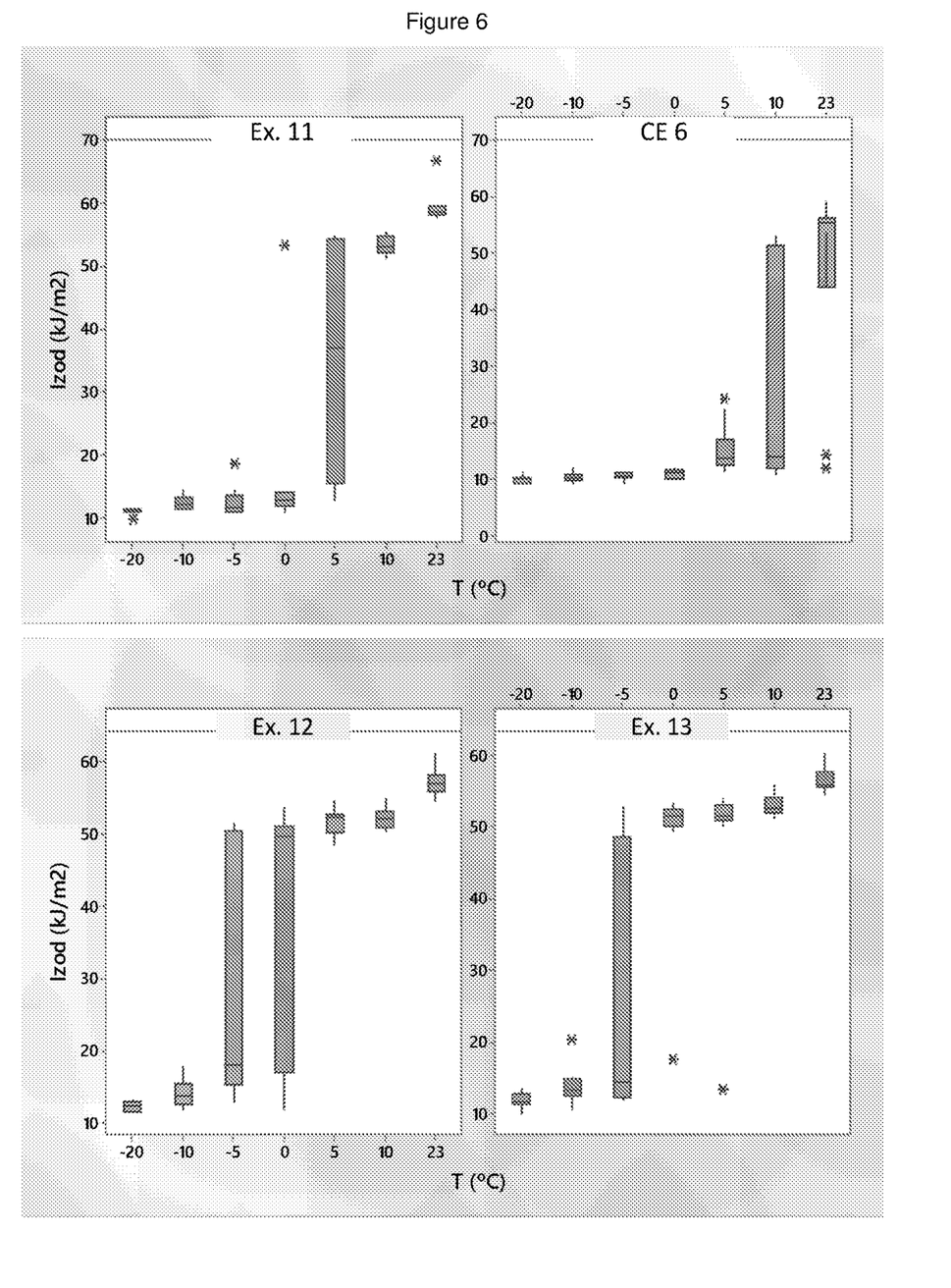
FIG. 6 is a graphical illustration of the impact behaviour (Izod impact) as a function of temperature for Examples 11-13 and Comparative Example 6.

Melt polycarbonate prepared from BPA and DPC having a MVR of 22 cm$^3$/10 min, with different Fries branching levels and using PCP as endcapping agent were prepared to study the impact performance. FIG. 6 shows the impact behaviour (Izod impact) as a function of temperature.

TABLE 8

| | End Cap (%) | OH (ppm) | Fries (ppm) | % Bulky endgroups |
|---|---|---|---|---|
| Ex. 11 | 88.66 | 388 | 622 | 20 |
| CE6 | 80.98 | 660 | 1600 | 25 |
| Ex. 12 | 79.39 | 718 | 704 | 55 |
| Ex. 13 | 78.16 | 768 | 723 | 62 |

The invention claimed is:
1. A method for the continuous multi-stage manufacture of an end-capped polycarbonate comprising,
  i) preparing a monomer mixture in a monomer mixing stage by mixing a bisphenol, a diphenyl carbonate and optionally a transesterification catalyst in at least one monomer mixing device,
  ii) preparing a carbonate oligomer in an oligomerisation stage by reacting said monomer mixture in at least one oligomerisation reactor,
  iii) preparing the polycarbonate in a polymerisation stage by further reacting the carbonate oligomer of the oligomerisation stage in at least one polymerisation reactor,
  wherein an end-capping agent is added to the monomer mixture in the monomer mixing stage and/or to at least one oligomerisation reactor in the oligomerisation stage, the endcapping agent is selected from paracumyl phenol, dicumyl phenol, p-tert-butyl phenol and mixtures of at least two of said endcapping agents; and
  wherein said polycarbonate having
  a melt volume rate of at least 20 cm$^3$/10 min determined in accordance with ISO 1133 (300° C., 1.2 kg)
  a terminal hydroxyl group content of at most 800 ppm by weight
  a Fries branching content of at most 1300 ppm by weight
  a content of bulky end groups of at least 20 mol % defined as the sum of the mol % of end-groups based on said bisphenol and the mol % of end-groups based on said endcapping agent.
2. A method for reducing the brittle ductile transition temperature of a polycarbonate comprising preparing polycarbonate with the method according to claim 1.

* * * * *